May 30, 1961
C. M. HINES
2,986,629
STUCK-BRAKE SIGNALLING APPARATUS WHEREBY STUCK-BRAKE
CONDITION PRODUCES A SIMULATED FAULT
IN BRAKE CONTROL CIRCUIT
Filed Oct. 30, 1951
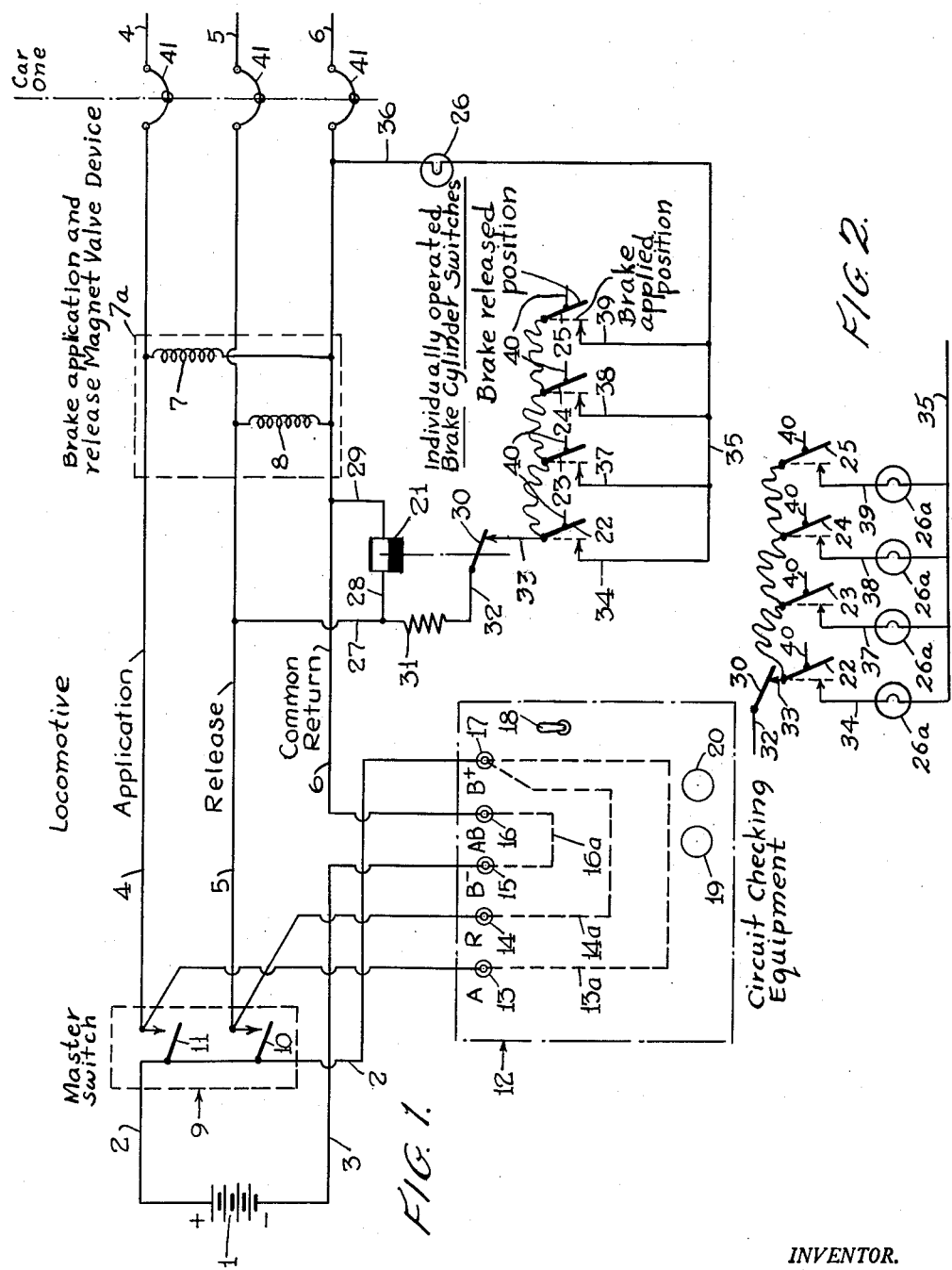
INVENTOR.
Claude M. Hines
BY
Frank E. Miller
ATTORNEY

United States Patent Office 2,986,629
Patented May 30, 1961

2,986,629

STUCK - BRAKE SIGNALLING APPARATUS WHEREBY STUCK-BRAKE CONDITION PRODUCES A SIMULATED FAULT IN BRAKE CONTROL CIRCUIT

Claude M. Hines, Verona, Pa., assignor to Westinghouse Air Brake Company, Wilmerding, Pa., a corporation of Pennsylvania Filed Oct. 30, 1951, Ser. No. 253,795

7 Claims. (Cl. 246—169)

This invention relates to apparatus for detecting and signalling a "stuck" condition of brakes on a vehicle such as a train of cars, in which condition the braking members, such as the brake shoes, remains "stuck" in braking position when they should be in the no-braking or release position.

It is possible that the brakes on one or more of the cars of a train may become "stuck" and fail to release after a brake application in response to movement of the brake control valve device into release position. Such a "stuck" brake acts to cause undue wear of the brake shoes and wheels, flat wheels, and other undesired effects.

It is an object of my present invention to provide a checking and signalling apparatus to detect "stuck" brakes and automatically signal the trainmen of the train of such a fault.

It is another object of my invention to provide a novel arrangement for indicating and signalling a "stuck" brake condition on a train of cars, characterized in that it utilizes and functions with existing known circuit checking apparatus of the type referred to as the Westinghouse SC-2 circuit checking equipment such as substantially shown in United States Patent No. 2,573,442, issued October 30, 1951.

It is another object of my invention to utilize a brake control circuit checking and signalling apparatus to also detect and signal "stuck" brakes.

The above objects together with other objects which will be made apparent in a subsequent description of my invention, are obtained by apparatus to be hereinafter described when read in connection with the accompanying drawing, wherein Fig. 1 is a diagrammatic view showing a simplified electric control apparatus for train brakes typical of the electro-pneumatic train brake control apparatus in commercial use, and a circuit checking and signalling apparatus embodying my novel "stuck" brake checking and signalling apparatus; and Fig. 2 is a fragmental diagrammatic view, showing a modified embodiment of my novel "stuck" brake checking and signalling apparatus utilizing individual brake cylinder signalling means.

While a simplified brake control apparatus embodying two brake control circuits is shown in the drawing for the purpose of illustrating the nature and main utility of my apparatus, it will be understood that the system illustrated and described herein is intended to and may be applied to function with any similar electric control apparatus employing a plurality of electric control wires and control units which operate any multiple position mechanisms such as brake cylinders.

The control circuits shown in the drawing are the standard control circuits as shown, for example, in the aforementioned Patent No. 2,573,442 for controlling such as the brake control magnet valves in an application and release magnet valve device 7a on each car of the train. The circuits shown represent the application control circuit and the release control circuit, which includes the common return wire, on a locomotive in junction via wire couplers 41 with corresponding wires on an adjacent car for extention throughout the train. The control apparatus shown on the locomotive includes a source of direct current voltage such as a battery 1, a battery supply wire 2, a battery return wire 3, application wire 4, release wire 5, battery return wire 6, an application and release magnet valve device 7a including magnet valves (not shown) operably connected to application and release magnet coils 7 and 8, respectively and a device for completing the circuits to energize said coils usually a master controller device, represented on this drawing by master switch 9 having a release contact 10 and an application contact 11. It will be understood that there is an application and release magnet valve device 7a on the locomotive and on each car of the train, but, in behalf of simplification, only the one device 7a on the locomotive necessary for an understanding of the invention is shown herein.

The application and release magnet valve device 7a on each unit of the train controls the supply and release of fluid under pressure to and from the respective brake cylinder (not shown) or brake cylinders (not shown), as the case may be, on such unit to effect application and release, respectively, of the brakes on the wheels of the unit. In each of the application and release magnet valve devices 7a, energization and de-energization of the respective application magnet coil 7 will operate supply valve means (not shown) to establish and disestablish, respectively, a supply communication between a source (not shown) of fluid under pressure and the brake cylinder or brake cylinders on the respective train unit, and energization and de-energization of the respectvie release magnet coil 8 will operate release valve means (not shown) to disestablish and establish, respectively, a fluid pressure exhaust communication between said brake cylinder or brake cylinders and the atmosphere.

In applying the brakes, the release and application magnet coils 8 and 7 will be energized consecutively in the order named to first close off the brake cylinders from the atmosphere and then effect supply of fluid under pressure to said cylinders, and in releasing the brakes, said magnet coils 8 and 7 will be de-energized consecutively in the reverse order to cut off supply of fluid under pressure to the brake cylinders and then vent said cylinders to the atmosphere. Energization of the release magnet coil 8 while the application magnet coil 7 is simultaneously deenergized operates to hold a desired fluid pressure in the brake cylinders to cause the brakes to remain applied to a degree corresponding to the fluid pressure held in the brake cylinders.

It will be apparent from the foregoing that in the particular brake control apparatus illustrated herein, energization of the control circuit for release magnet coils 8 is an indication that the brakes should be applied and deenergization of that circuit is an indication that the brakes should be released. The energized and deenergized conditions for the control circuits of the release magnet coils 8, are utilized in accordance with my invention, in cooperation with other apparatus hereinafter to be described to obtain indication of a "stuck" brake condition.

The circuit-checking and signalling apparatus indicated in the drawing is the standard SC–2 equipment similar to the equipment shown in the aforementioned Patent No. 2,573,442. This circuit checking apparatus is of the Wheatstone bridge type comprising two similar Wheatstone bridge arrangements, one bridge arrangement being employed for checking the application control circuit comprising the application and battery return wires extending through the train and the respective application magnet valve coils connected in parallel between said wires on the individual cars of the train, the other bridge arrangement being employed for checking the release control circuit comprising the release and battery return wires extending through the train and the respective release magnet valve coils connected in parallel between said wires on the individual cars of the train. The circuit checking equipment operates on the principle that an unbalance of either or both of the bridge arrangements results if a fault, such as a short circuit between two train wires constituting the brake control circuits, occurs on the corresponding control circuit or both control circuits, and cooperating relays (not shown) function responsively to said unbalance to effect the energization of a signal lamp 20 visible to the operator as explained in detail in the previously mentioned patent.

For purposes of illustration, the circuit checking equipment is shown herein as embodied in a casing 12 in which are shown the application terminal 13, the release terminal 14, the B— terminal 15, the common return terminal 16, the B+ terminal 17, starting switch 18, "all-clear" lamp 19, and a fault lamp 20. It should be understood, by reference to the standard SC-2 checking equipment, described in detail in Patent No. 2,573,442, that the B+ terminal 17 is connected to the application terminal 13 and the release terminal 14 by way of the bridge circuits (indicated by the broken lines 13a and 14a) included in the casing 12, and that the common return terminal 16 is connected to the B— terminal by way of operating circuits (indicated by the broken line 16a) included in the casing 12.

The "stuck" brake detecting portions of this apparatus includes a slow release relay 21, the winding of which is connected across the release wire 5 and the battery return wire 6 in parallel with the release control circuit and thus also in parallel with release magnet coils 8, and a series of mechanically operated switch members 22, 23, 24 and 25, one for each brake cylinder (not shown) also connected in similar circuit relationship to the release control circuit and release magnet valve coils.

The switch members 22, 23, 24 and 25 are mechanically connected to the brake shoe actuating members, such as the brake cylinder piston rods (not shown) in the brake cylinders on each train unit, through respective connecting members 40, such that the said switch members are closed when the respective brake shoes are in brake application position, as shown by the broken lines, and opened when the brake shoes are in brake release position, as shown by the solid lines. The aforesaid switch members are connected in parallel with each other and adapted to impose a low-resistance shunt circuit between the release control wire 5 and the battery return wire 6 in the event the brake actuating members fail to move out of brake application position in response to the attempt to release the brakes in the usual manner with a control device (not shown) on the locomotive or other control station, thereby simulating a fault in the said control circuit and causing a signal indication on the signal apparatus included in the SC-2 checking equipment. An indicating lamp 26 is connected in series with switch members 22, 23, 24 and 25 to indicate locally on each car whether a brake shoe on a particular car is stuck, as will be explained. The resistance of lamp 26 plus the resistance of a resistor 31 in series with lamp 26 in a detecting circuit provides a low-resistance shunt across the release control circuit so as to cause the SC-2 checking equipment to operate just as in the case of a fault in the circuit in event of a stuck brake, and also does not prevent the pick-up of relay 21 anytime under the control of the master switch 9. If the resistance of lamp 26 is sufficient, resistor 31 may be omitted.

It should be noted that this just described "stuck" brake detecting portion of my apparatus is included on each car of a train, but for purposes of illustration only that portion of the apparatus for one car is shown herein.

OPERATION

(a) Brake release position with no "stuck" brakes

To condition the apparatus for operation, the switch 18 in the casing 12 is moved to its "on" position to start the checking and signalling apparatus in operation in its usual manner. With the switch 18 on, as is known, a checking circuit is completed to supply a checking current through the control wires of a train. This checking circuit can be traced from one terminal of battery 1 by way of battery supply wire 2 to the B+ terminal 17 in the casing 12, through the bridge circuits (indicated as broken lines 13a and 14a) within the casing 12 to both the application and release terminals 13 and 14, and thence through the application and release train wires 4 and 5 to all the magnet valve coils 7 and 8 in the train to the battery return wire 6, back to the common return terminal 16 on the casing 12, through the operating circuits (shown as broken line 16a) within casing 12 to the B— terminal 15, and battery return wire 3 to the opposite terminal of the battery 1. Connected in parallel with the release control circuit and thus also the release control checking circuit, are the relay 21 and the switch members 22, 23, 24 and 25 as previously described. However, the resistance of the winding of relay 21 is such that the checking current is insufficient to energize the relay 21 to its picked-up position. Therefore, since no "stuck" brakes exist and assuming no faults exist in the brake control circuits, the "all-clear" lamp 19 is lit, but if a fault occurs in the brake control circuits, the checking apparatus within casing 12 operates to light the fault lamp 20 to indicate such fault.

(b) Brake application

To effect a brake application, the master switch 9 is operated in the usual manner to close the contacts 10 and 11, thus completing circuits from the battery 1 throughout the train control wires 4 and 5, and the magnet valve coils 7 and 8 in the application and release magnet valve device 7a to energize both of said coils. The magnet valves in turn operate to effect a supply of fluid under pressure to the brake cylinders, thereby causing a brake application in a usual and well-known manner as disclosed for example in the aforementioned Patent No. 2,573,442. The brake operating current now in the control circuits in sufficient to energize and pickup the relay 21, the winding of which is connected in parallel with the release magnet valve coils 8 by way of wires 27, 28, winding of relay 21, and wire 29. With relay 21 picked-up, a contact member 30 of said relay is opened thus making it impossible for any circuit to be established through the switch members 22 to 25. The switch members 22 to 25 being mechanically connected to the brake actuating members (that is, the rigging or the brake cylinder piston rod) through connecting members 40 are thus moved to their respective closed positions in response to the brake application.

(c) Brake release after application

When the brakes are released after an application, the master switch contact members 10 and 11 are opened to disconnect the brake operating current supply from the train control wires 4 and 5. Thus, both coils 7 and 8 in the application and release magnet valve device 7a are deenergized to effect the movement of the brake actuating members (not shown) toward release position in the well-known manner as described in detail for example in Patent No. 2,573,442. Simultaneously with the deenergizing of the magnet valve coils to release the brakes, the current for energizing the relay 21 to its picked-up position is interrupted by the opening of the master switch contact member 10. However, the relay 21 does not immediately drop-out and close the contact member 30 due to the slow release characteristic of said relay.

As the brake actuating members (not shown) move toward release position the switch members 22 to 25 respectively are moved to their open positions by the connecting members 40 before the slow release period of relay 21 is expired. If a brake shoe fails to move to release position in response to deenergization of coils 7 and 8, or becomes "stuck" for any reason, the respective switch member 22, 23, 24 or 25 for that particular brake will not move to its open position, but will remain closed. If this occurs, as soon as the slow release period for relay 21 is expired and the contact member 30 of said relay drops to its closed position, a low-resistance shunt circuit is completed between the battery return wire 6 and the release wire 5 to energize the indicating lamp 26. This circuit may be traced from the release wire 5 via wire 27, resistor 31, wire 32, closed contact member 30 of relay 21, wire 33, the closed switch member 22, 23, 24 or 25 connected to the actuating member of the stuck brake by a connecting member 40, respective wire 34, 37, 38 or 39, wire 35, indicating lamp 26, and wire 36 to the battery return wire 6. The introduction of this just described low-resistance shunt circuit across the release wire 5 and the battery return wire 6 causes an unbalance of the Wheatstone bridge arrangement (not shown) in the casing 12 for the release control circuit, thus effecting the lighting of the fault lamp 20 as previously explained to indicate to the operator that a fault exists. It is apparent that if more than one, or any other brake should become "stuck," the detecting circuit would include the respective switch member 23, 24 or 25, and corresponding wires 37, 38 and 39.

The slow release characteristic of relay 21 is necessary for the reason that upon a brake release after a brake application, the current energizing the relay 21 to its picked-up position is removed immediately upon the opening of the master switch contact member 10, whereas, the switch members 22 to 25 being attached to the brake actuating members by connecting members 40 may take several seconds to open, thus an erroneous fault indication is prevented by allowing time for switch members 22 to 25 to open before the relay contact member 30 is closed.

It can thus be seen that if a "stuck" brake does occur, a signal lamp 20 in casing 12 indicates a fault on the brake control circuit and a signal lamp 26 indicates such fault on the car of the train on which the "stuck" brake occurs. Other signal lamps 26a may be incorporated in series-circuit relation to the individual switches 22, 23, 24 and 25, respectively, and located near the particular brake, to indicate which brake is stuck, as indicated in the embodiment shown in Fig. 2.

*(d) Reapplication of brakes after brake release with a "stuck" brake*

Reapplication of the brakes after a brake release in which a "stuck" brake occurs, is done as previously described as a normal brake application. This is possible due to resistor 31 assisted by the resistance of lamp 26 in the shunt circuit (made by the closed switch member 22 to 25 on the "stuck" brake) preventing the by-passing of the brake operating current from the release magnet valve coils 8, such that said magnet valve coils may operate in the usual manner. As the resistor 31 assisted by the resistance of lamp 26 prevents the brake operating current from being by-passed through the shunt circuit previously described, the combination of the two mentioned resistances also causes current to pass through the winding of relay 21 thereby energizing relay 21 to its picked-up position to interrupt the mentioned shunt circuit.

Having now described my invention, what I claim as new and desire to secure by Letters Patent is:

1. For use in connection with an electrically controlled brake system for a train of cars including a plurality of train wire circuits, the combination of apparatus for detecting and signalling the occurrence of a fault in said train wire circuits, and means for creating a fault in one of said circuits responsively to a stuck brake condition on one or more cars of the train, that is a condition wherein the brakes remain applied during a brake release period, thereby to cause said apparatus to signal the said stuck brake condition.

2. For use in connection with an electrically controlled train brake system including a plurality of train wire circuits, the combination of means operative upon the occurrence of a fault condition in any one of said circuits for effecting an indication thereof, and means for establishing a shunt circuit simulating a fault condition in one of said circuits only when a braking member is in a stuck brake condition, that is remains in brake applying position during a brake release period, thereby to cause said first means to operate to produce an indication of such stuck brake condition.

3. For use in connection with an electrically controlled train brake system including a plurality of train wire circuits, the combination of means operative upon the occurrence of a fault condition in any one of said circuits for effecting an indication thereof, means for establishing a shunt circuit simulating a fault condition in one of said circuits only when a braking member is in a stuck brake condition, that is remains in brake applying position during a brake release period, thereby to cause said first means to operate to produce an indication of such stuck brake condition, and signal means local to each car operative to effect a signal in response to establishment of said shunt circuit.

4. For use in connection with an electrically controlled train brake system including a plurality of train wire circuits, the combination of a first means operative upon the occurrence of a fault condition in any one of said control circuits for effecting an indication thereof, relay means actuated in response to energization of one of said control circuits, switch means actuated by a brake member of said brake system functioning cooperatively with said relay means to establish a shunt circuit simulating a fault condition in said one control circuit when said braking member is in a stuck brake condition, that is remains in the brake applied position when said one control circuit is deenergized during a brake release period, thereby to cause said first means to indicate such stuck brake condition.

5. For use in connection with an electric control system including a plurality of control circuits for controlling an element to move to at least two different control positions, the combination of apparatus for detecting and signalling the occurrence of a fault in said control circuits, and means for creating an intentional fault in one of said circuits automatically upon failure of said movable element to move to the proper one of said control positions, thereby to cause said apparatus to signal said failure.

6. The combination with an electrical brake control system for one or more cars of a train including a plurality of control circuits and a control device operative to effect the imposition of an operating voltage on said plurality of control circuits, of means for detecting and signalling the occurrence of a fault condition in any one of said circuits including a source for supplying checking current to said circuits, an electric relay connected to one of said control circuits on a car of said train and operatively responsive to energization of said one control circuit by the said operating voltage supplied from said control device but unresponsive to said checking current, switch means actuated to a closed position only when a braking member is in brake applying position, said switch means and said relay functioning cooperatively to establish a shunt circuit simulating a fault condition of said one control circuit only when said relay is not energized by said operating voltage and said braking member fails to return out of brake applying position during a brake release period, thereby to cause said detecting and signalling means to signal such failure of the braking member to return to release position.

7. The combination with a brake control circuit adapted to be energized during a brake application and de-energized to effect a brake release, circuit checker means responsive to a fault condition in said brake control circuit to signal indication of such condition, and means rendered effective by de-energization of said circuit to establish the equivalent of a fault condition in said circuit when a brake application remains unintentionally in effect during such circuit deenergization.

References Cited in the file of this patent

UNITED STATES PATENTS

| | | |
|---|---|---|
| 1,052,184 | Snapp | Feb. 4, 1913 |
| 1,568,041 | Beshears | Jan. 5, 1926 |
| 1,745,307 | Mason | Jan. 28, 1930 |
| 1,852,421 | Langdon | Apr. 5, 1932 |
| 1,961,855 | Stoltz | June 5, 1934 |
| 2,021,846 | Wion | Nov. 19, 1935 |
| 2,026,489 | Benedict | Dec. 31, 1935 |
| 2,096,934 | Hitchcock | Oct. 26, 1937 |
| 2,464,978 | Hines | Mar. 22, 1949 |
| 2,573,442 | Hines | Oct. 30, 1951 |
| 2,641,691 | Bone | June 9, 1953 |